United States Patent [19]

Ishizuka

[11] 4,147,255
[45] Apr. 3, 1979

[54] PROCESS FOR SYNTHESIZING DIAMONDS

[76] Inventor: Hiroshi Ishizuka, 19-2 Ebara 6-chome, Shinagawa-ku, Tokyo, Japan

[21] Appl. No.: 845,960

[22] Filed: Oct. 27, 1977

[30] Foreign Application Priority Data

Oct. 27, 1976 [JP] Japan ................................ 51/129042

[51] Int. Cl.² ...................... C01B 31/06; B65D 85/00
[52] U.S. Cl. ..................................... 206/525; 423/446
[58] Field of Search ......................... 423/446; 425/77; 206/525

[56] References Cited

U.S. PATENT DOCUMENTS

| | | | |
|---|---|---|---|
| 2,992,900 | 7/1961 | Bovenkerk | 423/446 |
| 3,297,407 | 1/1967 | Wentorf | 423/446 |
| 3,317,035 | 5/1967 | Cannon | 206/525 |
| 4,042,673 | 8/1977 | Strong | 423/446 |

OTHER PUBLICATIONS

Bundy et al., "J. Chemical Physics" vol. 35, No. 2, 1961, pp. 383–391.

*Primary Examiner*—Edward J. Meros
*Attorney, Agent, or Firm*—Birch, Stewart, Kolasch and Birch

[57] ABSTRACT

A process for synthesizing diamonds and more particularly a system for indirectly heating raw material charged in a reaction chamber for the diamond synthesis. The system comprises a hollow cylindrical reaction vessel of refractory material, a thin tubular electrically heating element fitted in the vessel, a pair of disk plates each of thermal and electrical insulation material arranged to close open end of the heating element, a pair of electrically conductive disks each electrically contacting with edge of said heating element, and a pair of electrically conductive rings each contacting with each of said conductive disks to supply electrical current to said heating element.

3 Claims, 1 Drawing Figure

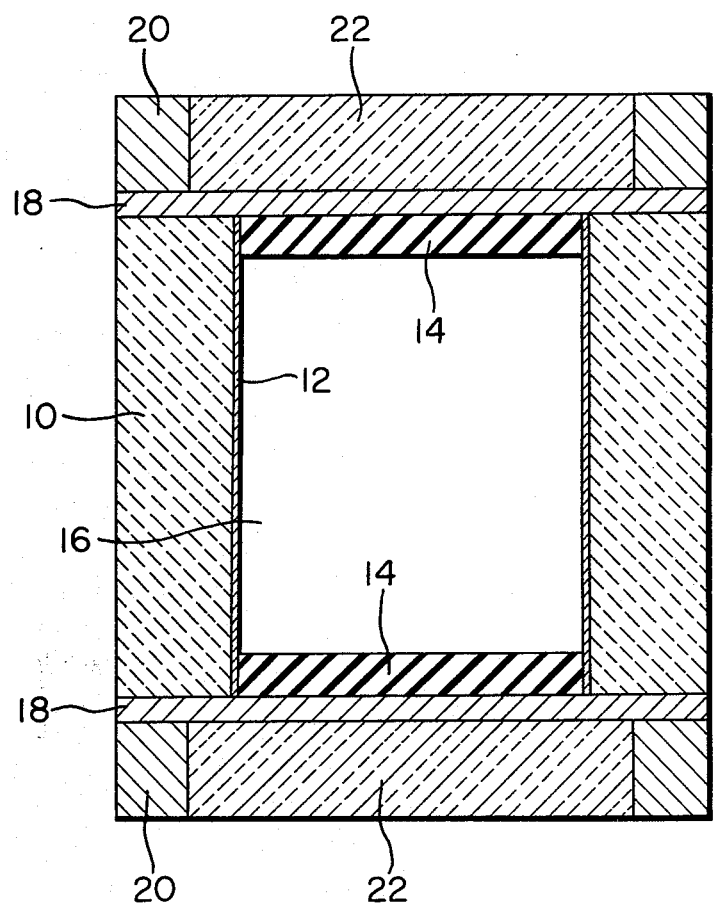

PROCESS FOR SYNTHESIZING DIAMONDS

BACKGROUND AND SUMMARY OF THE INVENTION

The present invention relates to a process for synthesizing diamonds, and more particularly to an improvement in and/or relating to a system for heating raw materials in a reaction chamber for the synthesis of diamonds.

For synthesizing diamonds, there are two methods, namely the so-called direct method requiring only carbon as the raw material and the so-called indirect or catalytic method requiring as the raw materials carbon and a solvent-catalyst metal of cobalt, nickel or a like metal belonging to Group VIII of the periodic table or an alloy thereof. Both methods require substantially the same temperature condition of about 1,000° C. but the former requires a very severe pressure condition in the order of 400 Kb whereas to the contrary, only a pressure of 45 to 55 Kb is required in the latter. Therefore, the present invention has particular, though not exclusive, reference to a system for heating raw materials in a reaction chamber for the synthesis of diamonds with use of the indirect method.

In order to heat the raw materials charged into a reaction chamber, there have been proposed three systems, i.e. the so-called direct system wherein electrical current is directly passed through the raw materials per se to heat the same by utilizing those inherent electrical resistances (U.S. Pat. No. 2,947,609 and British Pat. No. 1,049,182), the so-called indirect system wherein electrical current is passed through a heating element arranged around a reaction vessel defining the reaction chamber to heat the raw materials the use of heat radiated from the heating element (U.S. Pat. No. 3,082,477 and British Pat. No. 951,167) and the so-called semi-direct system wherein electrical current is partially passed directly through the raw materials per se to heat the same by utilizing those inherent electrical resistances and partly passed through a heating element arranged in a reaction vessel to define the reaction chamber and to heat also the raw materials with use of heat radiated from the heating element (U.S. Pat. No. 2,947,610 and British Pat. No. 830,210).

The direct heating system has the advantages that a heat generation coefficient or thermal efficiency to supplied electrical current is higher than that in the indirect heating system and an inner volume of the reaction chamber can be made relatively larger to increase the yield in each reaction, since there is no special heating element required. The direct heating system has the disadvantage that maintenance of a certain constant heating condition throughout the reaction chamber is quite difficult because it is difficult to provide a uniform flow of electrical current through the raw materials which makes the current density distribution in the reaction chamber uneven. Thus, the temperature of the central portion in the reaction chamber is apt to be higher than that of peripheral portions which causes a relatively large temperature gradient therein. Also, the electrical resistance in the reaction chamber varies as conversion of the raw material carbon substance to diamonds proceeds, to cause a local temperature variation.

The indirect heating system has an advantage in that, as a whole, the temperature in the reaction chamber can be kept at a constant level regardless of the reaction progress but has the disadvantage that the inner volume of the reaction chamber is smaller, because the heating element must be arranged around the reaction vessel and upper and lower ends of the reaction vessel should be closed by a disk plate of electrical and thermal insulation material.

The semi-direct heating system is a combination of the direct system and the indirect system but has the disadvantage that the life of each punch for generating a high pressure in the reaction chamber becomes shorter since the heat generated in the reaction chamber is apt to be transmitted directly to each end portion of the oppositely arranged punches so as to generate the required high pressure in the reaction chamber.

Therefore, an object of the present invention is to provide a new indirect system for heating a reaction chamber, which obviates and overcomes the disadvantage encountered in the conventional indirect heating system as referred to without spoiling any advantage to be enjoyed in the conventional indirect heating system.

According to one of the aspects, the present invention is to provide a process for synthesizing diamonds by utilizing the new indirect heating system.

According to the invention, the process is attained by steps of charging a raw material containing at least material carbon into a reaction chamber defined by a thin tubular heating element and a pair of disk plates of a thermal and electrical insulation material and arranged in the heating element, generating required high pressure in the reaction chamber and applying electrical current to the heating element to indirectly heat the raw material in the reaction chamber.

According to another aspect, the present invention is to provide the new indirect heating system per se for carrying out the process.

According to the present invention, the system comprises a hollow cylindrical reaction vessel made of a refractory material, a thin tubular electrically heating element is fitted in the reaction vessel so as to circumferencially define the reaction chamber therein, a pair of disk plates each made of a thermal and electrical insulation material having a diameter substantially the same with the inner diameter of the heating element so as to be fitted therein to close the open end thereof and longitudinally define the reaction chamber, said reaction chamber being filled with a raw material which contains at least material carbon, a pair of electrically conductive disks, each electrically contacting the edge of said heating element, a pair of electrically conductive rings each arranged to contact with each of said electrically conductive disks to supply electrical current to said heating element, and a pair of heat insulation disks each fittedly arranged in each of said electrically conductive rings to prevent heat generated in the reaction chamber from leaking.

The heating element may be of a metal having a relatively high melting point, for instance 1,200° C. or more, such as iron, cobalt, nickel, molybdenum, tantalum or the like, or of a non-metal material such as graphite or the like. The disk plate is prepared by a material having a good electrical insulation property at a high temperature, such as magnesia, alumina, silica or a like oxide, or boron nitride or a like nitride.

According to one of embodiments of the invention, the space of reaction chamber may be partitioned with one or more disk plates made of the same material as the heat and electrical insulation disk plate disposed at both ends of the heating element. The disc plates divide the reaction chamber into two or more compartments which substantially completely inhibit the resistance heating of the raw material charged in each of said compartments.

When a diamond synthesis is carried out, in usual cases, the reaction chamber is previously filled with the raw materials in one of the following manners.

(a) a cylindrical block of a solvent-catalyst metal is arranged in the central portion of the reaction chamber and then two cylindrical blocks of graphite are charged in the reaction chamber to fulfill the a space therein to hold the metal block in a tight fashion.

(b) contrary to (a), a cylindrical graphite block is arranged in the central portion of the reaction chamber and then two cylindrical blocks of a solvent-catalyst metal are charged in the reaction chamber to fulfil a space therein to hold the graphite block in a tight fashion, (c) a graphite disk block is arranged at each end of the reaction chamber and the remaining space is filled with a mixture of graphite powder and solvent-catalyst metal granules, (d) a hollow cylindrical graphite is fitted in the reaction chamber and then a rod of a solvent-catalyst metal is fitted into the graphite cylinder, (e) graphite disk plates and solvent-catalyst metal disk plates are alternatively arranged to fulfil the reaction chamber (this is preferable, in view of the fact that the raw materials charged to the reactor can be made larger to attain a higher yield and the contacting area between the graphite and solvent-catalyst metal can be made larger) and the like.

In the manner of (e), further, diamond seed crystals may initially be arranged between each of said graphite solvent-catalyst metal disk plates, in order to obtain better quality diamond crystals. In this case, please note that no desired effect can be attained unless each of the diamond seed crystals has a diameter larger than $10\mu$, since smaller diamonds will disappear during a mutual diffusion between the material carbon such as graphite and the solvent-catalyst metal when the reaction chamber is heated to a temperature causing the conversion reaction of graphite to diamonds. This phenomenon of seed diamond disappearance or fusion can be prevented by arranging a separation disk plate between each graphite disk plate or diamond seed crystals and solvent-metal disk plate, said separation disk plate being of a thin metal plate having no affinity to carbon, such as copper, silver, gold or an alloy thereof. The separating plate serves to prevent an initial mutual diffusion between the graphite and solvent-catalyst metal to permit the effective use of diamond seed crystals having a diameter smaller than $10\mu$.

The present invention will now be further explained with reference to an accompanying drawing and some diamond synthetic Examples.

The single drawing schematically illustrates a system according to the invention to electrically heat materials accommodated in a reaction vessel. Reference numeral 10 is the hollow cylindrical reaction vessel of a refractory material such as a sintered agalmatolite. In the reaction vessel 10, there are arranged a tubular heating element 12 so as to contact the other surface thereof with the inner surface of the vessel 10 and a pair of disk members 14,14 of electrical insulation material such as an oxide of magnesia, alumina, silica and the like or a nitride of boron nitride and the like. Each of the disk members 14,14 is arranged within the element 12 and near its open end to define together with the element 12 the reaction chamber or space 16 wherein material carbon and a solvent-catalyst metal (not shown) are filled. Each end of the element 12 contacts with an electrically conductive disk 18 to which current is supplied through each of the opposed punches (not shown) and an electrically conductive ring 20 to generate heat in the element 12. In an inner space of each conductive ring 20, there is fittedly arranged a thermal insulation disk 22 of for instance, a fine sintered agalmatolite to protect the punch from the high temperature generated in the reaction chamber 16.

According to the system of the present invention, the heating element 12 and the electrical insulation disk members 14,14 are arranged as referred to and thus electrical resistance of the raw materials filled in the reaction chamber 16 is made markedly high in comparison with that of the element 12 to allow flow of at least major part of electrical current supplied through one of punches, and concerned conductive ring 20 and conductive disk 18 to the element 12, so that the raw materials are heated from peripheral portion thereof. One or more additional electrical insulation disk members similar to the disk members 14,14 may be arranged in the reaction chamber 16 to divide the chamber into some compartments, each of which accomodates material carbon and solvent-catalyst metal, so that the electrical current flows only through the element 12 to heat the materials from its peripheral portion.

EXAMPLE 1

In a hollow cylindrical reaction vessel of sintered agalmatolite (50 mm outer diameter, 30 mm inner diameter and 40 mm height), a cobalt tube of 0.5 mm thickness was fitted in the reaction vessel so as to contact its outer surface with the inner surface of the reaction vessel. In the cobalt tube, five graphite disk plates (29 mm outer diameter, 5 mm thickness) and four cobalt disk plates (29 mm, outer diameter, 2 mm thickness) were charged alternatively and then a sintered magnesia disk plate (29 mm outer diameter, 3.5 mm thickness) was fitted into the cobalt tube at each end to close the tube. The resulting reaction vessel was fitted into a hollow cylindrical body member of rigidly sintered alumina (165 mm outer diameter, 50 mm inner diameter and 120 mm height) and then the body member was placed in a high pressure apparatus having a die member with an inner diameter of 165 mm and a pair of truncated punches. A press load was applied under a sealing condition to the reaction vessel to generate therein a pressure of about 54 Kb and the reaction chamber was heated at about 1,400° C. for 20 minutes by applying current of 2,900 A to the cobalt tube through one of the punches. During the reaction period, the current level had not changed. As a result, diamond crystals of about 15 g were obtained.

EXAMPLE 2

In a cobalt tube similar to that as in Example 1 and fitted into a hollow cylindrical reaction vessel similar to that as in Example 1, three assemblies each of which is formed by clampingly combining a cobalt disk plate of 2 mm in thickness with two graphite disk plates of 4 mm thickness and two sintered cobalt disk plates of 2.5 mm thickness were arranged alternatively and then a similar sintered magnesia disk plate of 2.5 mm thickness was fitted into the cobalt tube at each end to close the tube. The resulting reaction vessel was fitted into a hollow cylindrical body member and plated in a high pressure apparatus to cause a reaction as in Example 1 excepting use of current of 2,700 A. As a result, diamond crystals of about 18 g were obtained.

EXAMPLE 3

An experiment was carried out in a manner similar to that in Example 2 excepting that, in this case, instead of the cobalt tube, a graphite tube of 2 mm thickness was fitted into the reaction vessel. The resulting reaction vessel was fitted in a hollow cylindrical body member and placed in a high pressure apparatus to generate in the reaction vessel a pressure of about 54 Kb. The reaction chamber was heated at about 1,400° C. by applying current of 2,500 A to the graphite tube. During the reaction period, the current level had not changed. As a result, diamond crystals of about 17 g were obtained.

EXAMPLE 4

In a hollow cylindrical reaction vessel as in Example 1, a cobalt tube, six graphite disk plates each having 4 mm thickness, three cobalt disk plates each having 2 mm thickness and from sintered magnesia disk plates each having 2.5 mm thickness were arranged as in Example 2 excepting that, in this case, diamond crystals of 10 to 20µ were previously arranged as seeds at each interface between the graphite and cobalt plates. The resulting reaction vessel was fitted into a hollow cylindrical body member and placed in a high pressure apparatus to cause a reaction under conditions of about 54 Kb and a current supply of 2,700 A for 10 minutes. As a result, diamond crystals of about 23 g were obtained, which were suitable as the raw material for preparing resin bonded diamond wheels.

EXAMPLE 5

In a hollow cylindrical vessel as in Example 1, a cobalt tube, five graphite disk plates each having 5 mm thickness and four cobalt disk plates each having 2 mm thickness were arranged as in Example 1 excepting that, in this case, a copper disk plate of 50µ thickness was interposed between each graphite and cobalt plate and diamond crystals of 40µ were also placed as seeds between each graphite and copper plate. The resulting reaction vessel was fitted into a hollow cylindrical body member and placed in a high pressure apparatus to cause a reaction under conditions of about 54 Kb and about 1,350° C. for 30 minutes by applying a press load and a current of 2,750 A. As a result, yellowish diamonds of about 12 g were obtained, each of which has a diameter of 0.2 to 0.5 mm and a well crystalized structure.

Comparative Example 1

A comparative test was carried out in a manner similar to that as in Example 1 excepting that, in this case, the cobalt tube and sintered magnesia disk plates were not used and instead of those, larger size cobalt tube and graphite disk plates were placed in the reaction vessel. The resulting reaction vessel was fitted into a hollow cylindrical body member and placed in a high pressure apparatus to generate in the reaction chamber a pressure of about 54 Kb by applying a press load. A current of about 3,700 A was required to maintain the reaction chamber at about 1,400° C. and during the reaction period, the current level had remarkably changed. As a result, diamond crystals obtained were of about 5 g only.

Comparative Example 2

Another comparative test was carried out in a manner similar to that in Example 1 excepting that, in this case, the sintered magnesia disk plates were not used and instead of those, larger size cobalt tube and graphite plates were placed in the reaction vessel. The resulting reaction vessel was fitted in a hollow cylindrical body member and placed in a high pressure apparatus to generate in the reaction chamber a pressure of about 54 Kb by applying a press load. A current of about 4,200 A was required to maintain the reaction chamber at about 1,400° C. As a result, diamond crystals obtained were of about 4 g only.

I claim:

1. A reaction device for the synthesis of diamonds which comprises a hollow, cylindrical reaction vessel made of a refractory material, a thin tubular electrical heating element contiguously fitted within the reaction vessel so as to define a reaction chamber therein, a pair of disk plates made of a thermal and electrical insulation material and each having a diameter substantially the same as the inner diameter of said heating element so as to be fitted therein to close both open ends of the heating element and to define the reaction chamber in its longitudinal direction, said reaction chamber being adapted to contain at least two layers of reaction materials which consist essentially of material carbon and a solvent-catalyst metal, at least one disk plate made of a thermal and electrical insulation material, said disk plate being disposed between adjacent layers of the reaction materials, a pair of electrically conductive disks each arranged to contact the free end of said heating element for supplying electrical current thereto for heating the same, a pair of electrically conductive rings, each being arranged to contact one of said electrically conductive disks for supplying electrical current to said heating element through said conductive disks, and a pair of heat insulation disks each being fittedly accommodated in each of said electrically conductive rings to prevent heat generated in the reaction chamber from leaking.

2. The device as claimed in claim 1, wherein the heating element is made of a material selected from the group consisting of iron, cobalt, nickel, molybdenum, tantalum and graphite.

3. The device as claimed in claim 1, wherein the thermal and electrical insulation disk plates are made of a material selected from the group consisting of magnesia, alumina, silica and boron nitride.

* * * * *